(12) United States Patent
Hayakawa et al.

(10) Patent No.: US 11,130,694 B2
(45) Date of Patent: Sep. 28, 2021

(54) RECOVERY METHOD FOR DISCHARGED COOLING WATER

(71) Applicant: KURITA WATER INDUSTRIES LTD., Tokyo (JP)

(72) Inventors: Kunihiro Hayakawa, Tokyo (JP); Kazuhisa Fujita, Tokyo (JP)

(73) Assignee: KURITA WATER INDUSTRIES LTD., Tokyo (JP)

( * ) Notice: Subject to any disclaimer, the term of this patent is extended or adjusted under 35 U.S.C. 154(b) by 336 days.

(21) Appl. No.: 15/741,920

(22) PCT Filed: Jun. 29, 2016

(86) PCT No.: PCT/JP2016/069282
§ 371 (c)(1),
(2) Date: Jan. 4, 2018

(87) PCT Pub. No.: WO2017/006824
PCT Pub. Date: Jan. 12, 2017

(65) Prior Publication Data
US 2018/0194659 A1 Jul. 12, 2018

(30) Foreign Application Priority Data
Jul. 9, 2015 (JP) .............................. JP2015-137916

(51) Int. Cl.
| | | |
|---|---|---|
| C02F 5/10 | (2006.01) | |
| C02F 1/00 | (2006.01) | |
| C02F 9/00 | (2006.01) | |
| C02F 1/44 | (2006.01) | |
| B01D 61/58 | (2006.01) | |
| F28F 19/00 | (2006.01) | |
| F28B 9/04 | (2006.01) | |
| F28F 25/02 | (2006.01) | |
| F28G 13/00 | (2006.01) | |
| B01D 61/14 | (2006.01) | |
| B01D 61/02 | (2006.01) | |
| C02F 103/16 | (2006.01) | |
| C02F 103/18 | (2006.01) | |
| C02F 1/66 | (2006.01) | |
| C02F 103/02 | (2006.01) | |
| C02F 103/28 | (2006.01) | |

(52) U.S. Cl.
CPC ............... *C02F 5/10* (2013.01); *B01D 61/58* (2013.01); *C02F 1/004* (2013.01); *C02F 1/441* (2013.01); *C02F 1/444* (2013.01); *C02F 9/00* (2013.01); *F28B 9/04* (2013.01); *F28F 19/00* (2013.01); *F28F 25/02* (2013.01); *F28G 13/00* (2013.01); *B01D 61/02* (2013.01); *B01D 61/14* (2013.01); *B01D 2311/04* (2013.01); *B01D 2311/12* (2013.01); *B01D 2311/18* (2013.01); *C02F 1/66* (2013.01); *C02F 5/105* (2013.01); *C02F 2103/023* (2013.01); *C02F 2103/16* (2013.01); *C02F 2103/28* (2013.01); *C02F 2303/08* (2013.01); *C02F 2303/22* (2013.01)

(58) Field of Classification Search
CPC . B01D 21/00; B01D 21/01; C02F 1/00; C02F 1/001; C02F 1/52; C02F 1/58; C02F 1/66; C02F 5/00; C02F 5/02; C02F 5/025; C02F 5/08; C02F 9/00; C02F 2103/00; C02F 2103/001; C02F 2103/007; C02F 2103/06; C02F 2103/10; C02F 2209/00; C02F 2209/06; C02F 2001/007
See application file for complete search history.

(56) References Cited

U.S. PATENT DOCUMENTS

| | | | | |
|---|---|---|---|---|
| 3,116,105 A | * | 12/1963 | Kerst ...................... | C02F 5/125 422/16 |
| 3,898,037 A | * | 8/1975 | Lange ....................... | C02F 5/12 422/16 |
| 8,668,779 B2 | * | 3/2014 | Cooper ................... | A61L 9/145 134/22.12 |
| 2013/0213870 A1 | * | 8/2013 | Tempest, Jr. .............. | C02F 9/00 210/181 |
| 2017/0260229 A1 | * | 9/2017 | Ormerod .................. | B01J 8/006 |

FOREIGN PATENT DOCUMENTS

| | | |
|---|---|---|
| JP | 2002-018437 A | 1/2002 |
| JP | 2003-001256 A | 1/2003 |
| JP | 2009-297600 A | 12/2009 |
| JP | 2014-195754 A | 10/2014 |
| JP | 2015-174030 A | 10/2015 |

(Continued)

OTHER PUBLICATIONS

Taiwan Patent Office, "Ofifce Action for Taiwanese Patent Publication No. 105121566," dated Jul. 19, 2019.

(Continued)

*Primary Examiner* — Clare M Perrin
(74) *Attorney, Agent, or Firm* — Manabu Kanesaka

(57) ABSTRACT

Water discharged from a circulating cooling water system is treated by a water recovery system including a clarification equipment and an RO membrane, and treated water is returned to the circulating cooling water system. A dispersant is added to the circulating cooling water system for dispersing scale components. The dispersant includes a polymer having a carboxyl group and having a weight average molecular weight of 5,000 or less, and permeates through the clarification equipment. The polymer having a carboxyl group and having a weight average molecular weight of 5,000 or less permeates through the clarification equipment, and performs as a scale dispersing agent for the RO membrane, preventing precipitation of scale. Since the polymer intrinsically has an anticorrosion effect, it becomes unnecessary to add a phosphoric acid compound to the cooling water system as an anticorrosion agent, or the required amount of the compound to be added can be reduced.

10 Claims, No Drawings

(56) References Cited

FOREIGN PATENT DOCUMENTS

| | | | |
|---|---|---|---|
| TW | 238257 B | 1/1995 | |
| TW | 200538405 A | 12/2005 | |
| TW | 200844054 A | 11/2008 | |
| WO | WO-2006009185 A1 * | 1/2006 | ........... B01D 61/025 |

OTHER PUBLICATIONS

PCT/ISA/210, "International Search Report for International Application No. PCT/JP2016/069282," dated Oct. 4, 2016.

* cited by examiner

RECOVERY METHOD FOR DISCHARGED COOLING WATER

TECHNICAL FIELD

The present invention relates to a method for recovering cooling water effluent which is applied to cooling facilities used in air conditioning systems for buildings and industrial processes such as chemical industry, paper industry, steelmaking industry, and electric power industry.

BACKGROUND ART

Scaling may occur on a heating surface and inside a pipe included in a cooling-water system, a boiler-water system, or the like which are brought into contact with water. In the case where such a system is operated at high cycles of concentration by reducing the amount of cooling water (blowdown) discharged to the outside of the system in order to save resources and energy, the salts dissolved in the water become concentrated and increase the likelihood of the heating surface becoming corroded. The concentrated salts also change into poorly soluble salts and precipitate as scale. If the scale is deposited on the walls and the like of apparatuses, significant malfunctions in the operation of a boiler, a heat exchanger, or the like, such as a reduction in thermal efficiency and clogging of pipes, may occur.

Water is effectively used to the extent possible in order to save water and energy. However, in the case where such a system is operated at further high cycles of concentration, it becomes not possible to prevent the precipitation of scale.

There has been an effort to recover cooling-water blowdown water with a recovery system and return the treated water to a cooling tower. The recovery system commonly removes salts (ions) through a reverse-osmosis membrane (RO membrane) and return the treated water to a cooling tower. For example, the following systems have been studied (PTL 1 to PTL 4).

System 1: Coagulation→Sand filtration→Safety filter→RO membrane

System 2: Coagulation→Sand filtration→Pretreatment membrane→RO membrane

System 3: Coagulation→Dissolved air flotation→Sand filtration→Safety filter→RO membrane System 4: Decarbonator→Pretreatment membrane→RO membrane System 5: Pretreatment membrane→RO membrane System 6: RO membrane System 6 is a simple system that includes only an RO membrane device and not capable of performing consistent treatment because an RO membrane is likely to become clogged with solid particles contained in the blowdown water.

Removing solid particles contained in the blowdown water by performing coagulation treatment or using a pretreatment membrane at a position upstream of an RO membrane as in Systems 1 to 5 increases the consistency of the RO membrane treatment. However, a dispersant contained in the blowdown water, which has been added to the water in a circulating cooling-water system, inhibits the coagulation treatment. Accordingly, the coagulation treatment performed in Systems 1 to 3 requires a considerably large amount of coagulant. An RO membrane device requires a dispersant in order to disperse scale components and thereby increase water recovery rate and consistency of the treatment. If the dispersant contained in the blowdown water is removed by the coagulation treatment, a dispersant needs to be added to water fed to the RO membrane in order to disperse scale components in the RO membrane and thereby increase the consistency of the treatment.

The dispersant contained in the blowdown water may be disadvantageously removed through a pretreatment membrane also in Systems 4 and 5, in which the coagulation treatment is not performed and solid particles contained in the blowdown water are removed through a pretreatment membrane. Therefore, it is necessary to add a dispersant to the RO membrane feed in order to increase the consistency in the treatment using the RO membrane device.

The inventor of the present invention found that using a dispersant capable of passing through a pretreatment membrane and the membrane in combination allows the dispersant to pass through the pretreatment membrane and, consequently, increases the consistency of the RO membrane without adding an additional dispersant to the RO membrane feed (PTL 4).

PTL 1: JP 2003-1256 A
PTL 2: JP 2002-18437 A
PTL 3: JP 2009-297600 A
PTL 4: JP 2015-174030 A

In the method described in PTL 4, cooling water effluent, such as blowdown water discharged from a circulating cooling-water system, is treated through an RO membrane and recovered by using a pretreatment membrane permeable to a dispersant added in the circulating cooling-water system, the pretreatment membrane being disposed upstream of the RO membrane. This enables the dispersant added in the circulating cooling-water system and contained in the cooling water effluent to pass through the pretreatment membrane and to be effectively used as a dispersant for the RO membrane and, consequently, eliminates the need to add a dispersant in the water recovery system or reduces the amount of dispersant added. As a result, a reduction in the water treatment costs and increases in water recovery rate and consistency of water recovery treatment may be achieved.

However, the inventor of the present invention found the following disadvantages as a result of further studies.

In PTL 4, if a polymer including only a carboxyl group is used as a dispersant, such a polymer may become insoluble depending on the pH condition of the water recovery system and cause clogging of the pretreatment membrane and the RO membrane. Therefore, in PTL 4, a polymer including a sulfonic group is used as a polymer capable of passing through the pretreatment membrane. Since this polymer has a low anticorrosive effect, it is necessary to further add, to the cooling-water system, a phosphoric acid compound, such as phosphoric acid, phosphonic acid, or polyphosphoric acid, and a zinc compound that serve as anticorrosives. The addition of the zinc compound is necessary when pipes and the like constituting the cooling-water system are made of iron materials but omissible when they are made of copper materials.

Recovering cooling water effluent discharged from a circulating cooling-water system that contains the phosphoric acid compound with an RO membrane increases the phosphorus concentration in the concentrate of the RO membrane. Since the concentrate having a high phosphorus concentration poses problems when discharged into, particularly, a closed water area, the concentrate of the RO membrane needs to be subjected to additional wastewater treatment.

SUMMARY OF INVENTION

The present invention provides a method and a system for recovering cooling water effluent with which cooling water effluent, such as blowdown water discharged from a circulating cooling-water system, is treated through an RO membrane and recovered with a high water recovery rate and high consistency while addressing the discharge of phosphorus contained in the RO membrane concentrate.

The inventor of the present invention found that, when cooling water effluent, such as blowdown water discharged from a circulating cooling-water system, is treated through an RO membrane and recovered, using a carboxyl group-containing dispersant having a weight-average molecular weight of 5,000 or less as a dispersant added in the circulating cooling-water system may suppress precipitation of scale on the RO membrane and limit an increase in the phosphorus concentration in the concentrate while preventing clogging of the membrane.

Although a polymer including a carboxyl group is considered to cause clogging of RO membranes in PTL 4, the inventor of the present invention found that carboxyl group-containing polymers having a low molecular weight do not cause clogging of RO membranes. A carboxyl group-containing polymer having a weight-average molecular weight of 5,000 or less is capable of passing through a clarification facility and suppressing scaling on an RO membrane as a scale inhibitor. Since carboxyl group-containing polymers have an anticorrosive effect, the use of a carboxyl group-containing polymer eliminates the need to add a phosphoric acid compound that serves as an anticorrosive to a cooling-water system or reduces the amount of the phosphoric acid compound required. This limits an increase in the phosphorus concentration in the RO membrane concentrate.

The summary of the present invention is as follows.

[1] A method for recovering cooling water effluent, the method comprising treating water discharged from a circulating cooling-water system including a dispersant with a water recovery system including a clarification facility and a reverse-osmosis membrane and returning the treated water to the circulating cooling-water system, wherein the dispersant includes a carboxyl group-containing polymer having a weight-average molecular weight of 5,000 or less, and wherein the dispersant is capable of passing through the clarification facility.

[2] The method for recovering cooling water effluent according to [1], wherein the carboxyl group-containing polymer having a weight-average molecular weight of 5,000 or less is a polymer of acrylic acid, methacrylic acid, maleic acid, or epoxysuccinic acid, a copolymer of two or more of the above acids, a salt of the polymer, or a salt of the copolymer.

[3] The method for recovering cooling water effluent according to [1] or [2], wherein the dispersant further includes a sulfonic group-containing polymer.

[4] The method for recovering cooling water effluent according to [3], wherein the sulfonic group-containing polymer is a copolymer produced by copolymerization of methacrylic acid and/or acrylic acid with 3-allyloxy-2-hydroxy-1-propanesulfonic acid and/or 2-acrylamido-2-methylpropanesulfonic acid.

[5] The method for recovering cooling water effluent according to any one of [1] to [4], wherein the clarification facility is any one of a filter, a strainer, a bag filter, a string-wound filter, a disc filter, a microfiltration membrane, and an ultrafiltration membrane.

[6] The method for recovering cooling water effluent according to any one of [1] to [5], wherein the pH of water fed to the clarification facility is 7 or more.

[7] The method for recovering cooling water effluent according to any one of [1] to [6], wherein the pH of water fed to the reverse-osmosis membrane is adjusted to be 4.0 to 7.5.

[8] The method for recovering cooling water effluent according to any one of [1] to [7], wherein a zinc compound is added to the circulating cooling-water system, the zinc compound serving as an anticorrosive.

[9] A system for recovering cooling water effluent, the system comprising a clarification facility through which water discharged from a circulating cooling-water system is passed, a reverse-osmosis membrane device through which water passed through the clarification facility is passed, and a return unit that returns water passed through the reverse-osmosis membrane device to the circulating cooling-water system, wherein the circulating cooling-water system includes a dispersant addition unit that adds a dispersant to the water system, wherein the dispersant includes a carboxyl group-containing polymer having a weight-average molecular weight of 5,000 or less, and wherein the dispersant is capable of passing through the clarification facility.

[10] The system for recovering cooling water effluent according to [9], wherein the carboxyl group-containing polymer having a weight-average molecular weight of 5,000 or less is a polymer of acrylic acid, methacrylic acid, maleic acid, or epoxysuccinic acid, a copolymer of two or more of the above acids, a salt of the polymer, or a salt of the copolymer.

[11] The system for recovering cooling water effluent according to [9] or [10], wherein the dispersant further includes a sulfonic group-containing polymer.

[12] The system for recovering cooling water effluent according to [11], wherein the sulfonic group-containing polymer is a copolymer produced by copolymerization of methacrylic acid and/or acrylic acid with 3-allyloxy-2-hydroxy-1-propanesulfonic acid and/or 2-acrylamido-2-methylpropanesulfonic acid.

[13] The system for recovering cooling water effluent according to any one of [9] to [12], wherein the clarification facility is any one of a filter, a strainer, a bag filter, a string-wound filter, a disc filter, a microfiltration membrane, and an ultrafiltration membrane.

[14] The system for recovering cooling water effluent according to any one of [9] to [13], wherein the pH of water fed to the clarification facility is 7 or more.

[15] The system for recovering cooling water effluent according to any one of [9] to [14], the system further comprising a pH-control unit that adjusts the pH of water fed to the reverse-osmosis membrane device to be 4.0 to 7.5.

[16] The system for recovering cooling water effluent according to any one of [9] to [15], wherein the circulating cooling-water system includes an anticorrosive addition unit that adds a zinc compound to the water system, the zinc compound serving as an anticorrosive.

Advantageous Effects of Invention

According to the present invention, treating the cooling water effluent in the clarification facility disposed upstream of the RO membrane enables removal of solid particles and the like contained in the cooling water effluent and increases consistency of the subsequent RO membrane treatment.

In the present invention, the dispersant added in the circulating cooling-water system and contained in the cooling water effluent passes through the clarification facility. This enables the dispersant to be effectively used as a dispersant for the RO membrane. Accordingly, it is not necessary to again add the removed dispersant at a position upstream of the RO membrane as in existing systems. This increases treatment efficiency in terms of economy and operation and markedly reduces the treatment costs. It is possible to increase consistency of the RO membrane treatment and water recovery rate by using the dispersant passed through the pretreatment membrane.

The carboxyl group-containing polymer having a weight-average molecular weight of 5,000 or less, which is used as a dispersant in the present invention, also has an anticorrosive effect. Thus, the use of the above carboxyl group-containing polymer eliminates the need to add a phosphoric acid compound that serves as an anticorrosive to the cooling-water system or reduces the amount of phosphoric acid compound required. Consequently, the phosphorus concentration in the RO membrane concentrate can be limited to a low level.

DESCRIPTION OF EMBODIMENTS

Embodiments of the present invention are described below in detail.

Cooling Water Effluent

A typical example of the cooling water effluent that is subjected to the water recovery treatment is blowdown water from a cooling tower. The present invention may be applied to not only the blowdown water but also various types of water discharged from a circulating cooling-water system. Part or the entirety of the circulating cooling water may be drawn through a circulation pipe included in a circulating cooling-water system, treated in accordance with the method according to the present invention, and returned to the circulating cooling-water system. In another case, effluent diverted from a pipe included in a side filter or a light filter may be treated and recovered.

In the present invention, the above types of cooling water effluent are used as water that is to be treated and treated sequentially through a clarification facility and an RO device. The treated water is returned to the circulating cooling-water system.

Dispersant

The circulating cooling-water system includes a dispersant that is a carboxyl group-containing polymer having a weight-average molecular weight of 5,000 or less. Although it is possible to perform sufficient treatment by using only the carboxyl group-containing polymer having a weight-average molecular weight of 5,000 or less as a dispersant, it is preferable to use a sulfonic group-containing polymer as a second dispersant in addition to the carboxyl group-containing polymer having a weight-average molecular weight of 5,000 or less which serves as a first dispersant.

The above first and second dispersants are preferably used as dispersants in combination for the following reasons.

Since the carboxyl group-containing polymer having a weight-average molecular weight of 5,000 or less is capable of passing through the clarification facility and has an anticorrosive effect, the use of the carboxyl group-containing polymer eliminates the need to add a phosphoric acid compound that serves as an anticorrosive to the cooling-water system or reduces the amount of the phosphoric acid compound required and, consequently, limits the phosphorus concentration in the RO membrane concentrate to a low level. Accordingly, the carboxyl group-containing polymer having a weight-average molecular weight of 5,000 or less is used as a dispersant. However, when the carboxyl group-containing polymer having a weight-average molecular weight of 5,000 or less is added alone to a circulating cooling-water system containing a zinc compound, zinc is likely to precipitate as scale in the system because the carboxyl group-containing polymer having a weight-average molecular weight of 5,000 or less is not capable of sufficiently dispersing the zinc compound added to the cooling-water system as an anticorrosive. Adding the second dispersant including a sulfonic group to the cooling-water system while using the carboxyl group-containing polymer having a weight-average molecular weight of 5,000 or less as a first dispersant prevents zinc from precipitating as scale and enhances the corrosion resistance of the cooling-water system.

In the case where the risk of phosphoric acid contained in the RO membrane concentrate posing problems is negligible, the sulfonic group-containing polymer, which is described below as a second dispersant, may be used alone as a dispersant. When a sulfonic group-containing polymer, such as a copolymer of acrylic acid (AA) with 2-acrylamido-2-methylpropanesulfonic acid (AMPS), that serves as a dispersant is added to the circulating cooling-water system and the cooling water effluent is treated in a clarification facility, such as the filter described below, and subsequently in an RO device at a pH of 5 or more or 7 or more, the sulfonic group-containing polymer can be passed through the clarification facility and effectively used as a dispersant for the RO membrane.

The first dispersant is preferably a carboxyl group-containing polymer having a weight-average molecular weight of 3,000 or less.

If the RO membrane device is operated under a high-pH condition, calcium, silica, and the like concentrated in the RO membrane device are likely to precipitate as scale. Accordingly, the treatment is performed under a low-pH condition as described below. In the case where the RO membrane device is operated under a low-pH condition, a dispersant including only a carboxyl group becomes insoluble and does not serve as a dispersant. However, a carboxyl group-containing dispersant having a weight-average molecular weight of 5,000 or less or preferably 3,000 or less does not cause clogging of the membrane and does not affect the treatment even when becoming insoluble.

The weight-average molecular weight of the first dispersant is preferably 1,000 or more, because a first dispersant having an excessively low molecular weight has a low dispersion effect.

Examples of a monomer constituting the carboxyl group-containing polymer used as a first dispersant include acrylic acid, methacrylic acid, crotonic acid, isocrotonic acid, vinylacetic acid, atropic acid, maleic acid, fumaric acid, itaconic acid, hydroxyethylacrylic acid, succinic acid, epoxysuccinic acid, and salts of the above acids. The first dispersant may be a homopolymer of any one of the above monomers or a copolymer of two or more of the above monomers. The first dispersant is particularly preferably a polymer of acrylic acid, methacrylic acid, maleic acid, or epoxysuccinic acid, a copolymer of two or more of the above monomers, a salt of the polymer, or a salt of the copolymer.

The first dispersant includes a carboxyl group and does not include a sulfonic group. Thus, the first dispersant is distinguished from the second dispersant.

The first dispersant may be only one carboxyl group-containing polymer or a mixture of two or more carboxyl group-containing polymers.

The second dispersant is a polymer including a sulfonic group and is preferably a polymer including a sulfonic group and a carboxyl group. Examples of the polymer including a sulfonic group and a carboxyl group, which is suitable as a dispersant, include a copolymer of a monomer including a sulfonic group with a monomer including a carboxyl group and a terpolymer of these monomers with another monomer capable of copolymerizing with the monomers.

Examples of the monomer including a sulfonic group include conjugated diene sulfonic acids, such as 2-methyl-1,3-butadiene-1-sulfonic acid; unsaturated (meth)allyl ether monomers including a sulfonic group, such as 3-(meth)allyloxy-2-hydroxypropanesulfonic acid; 2-(meth)acrylamide-2-methylpropanesulfonic acid; 2-hydroxy-3-acrylamidepropanesulfonic acid; styrenesulfonic acid; methallylsulfonic acid; vinylsulfonic acid; allylsulfonic acid; isoamylenesulfonic acid; and salts of the above monomers. Among these, 3-allyloxy-2-hydroxy-1-propanesulfonic acid (HAPS) and 2-acrylamido-2-methylpropanesulfonic acid (AMPS) are preferable. The above monomers may be used alone or in a mixture of two or more.

Examples of the monomer including a carboxyl group include acrylic acid, methacrylic acid, crotonic acid, isocrotonic acid, vinylacetic acid, atropic acid, maleic acid, fumaric acid, itaconic acid, hydroxyethylacrylic acid, succinic acid, epoxysuccinic acid, and salts of the above monomers. Among these, acrylic acid and methacrylic acid are preferable. The above monomers may be used alone or in a mixture of two or more.

Examples of the monomer capable of copolymerizing with the above monomers include amides, such as N-tert-butylacrylamide (N-tBAA) and N-vinylformamide.

Specific examples of the second dispersant include, but are not limited to, the following.

Copolymer produced by copolymerization of acrylic acid (AA) with 2-acrylamido-2-methylpropanesulfonic acid (AMPS) at a ratio AA:AMPS=70 to 90:10 to 30 (molar ratio)

Copolymer produced by copolymerization of AA with AMPS and an amide, such as N-tert-butylacrylamide (N-tBAA), at a ratio of AA:AMPS:amide=40 to 90:5 to 30:5 to 30 (molar ratio)

Copolymer produced by copolymerization of AA with 3-allyloxy-2-hydroxypropanesulfonic acid (HAPS) at a ratio AA:HAPS=70 to 90:10 to 30 (molar ratio)

The weight-average molecular weight of the sulfonic group-containing polymer used as the second dispersant is preferably 1,000 to 30,000. If the weight-average molecular weight of the second dispersant is less than 1,000, the dispersion effect of the second dispersant may be insufficient. If the weight-average molecular weight of the second dispersant is more than 30,000, the dispersant is difficult to pass through the clarification facility and the polymer may adsorb on the clarification facility and the RO membrane to cause clogging of the membrane.

The amount of dispersant added to the circulating cooling-water system is preferably set such that the concentration of the active component (the above polymer) is 3 to 30 mg/L as solid and is particularly preferably set such that the concentration of the active component is 5 to 20 mg/L as solid in consideration of dispersion effect in the cooling tower, economy, and dispersion effect in the RO membrane feed. In the case where the first and second dispersants are used in combination, it is preferable to use the dispersants such that the total concentration of the first and second dispersants falls within the above range. The ratio between the amounts of the first and second dispersants is preferably, but not limited to, 1:1 to 1:9 (weight ratio). The method of adding the dispersant to the circulating cooling-water system and the position at which the dispersant is added to the circulating cooling-water system are not limited.

Anticorrosive

Commonly, a phosphoric acid compound and a zinc compound are added to a circulating cooling-water system in order to prevent corrosion of facilities and pipes included in the cooling-water system. The addition of a zinc compound is necessary when the facilities and pipes are made of iron materials and omissible when the facilities and pipes are made of copper materials. Since the carboxyl group-containing polymer used as a dispersant in the present invention is capable of reacting with zinc to exhibit the anticorrosive effect even in the absence of phosphorus, the use of the carboxyl group-containing polymer reduces the amount of phosphoric acid compound required for corrosion prevention or eliminates the need to add the phosphoric acid compound to the cooling-water system.

Examples of the phosphoric acid compound include phosphoric acid, phosphonic acid, and polyphosphoric acid. Specific examples thereof include phosphonic acids, normal phosphates, polyphosphates, and phosphoric acid esters, such as hydroxyethylidene diphosphonic acid, phosphonobutanetricarboxylic acid, ethylenediamine tetramethylene phosphonic acid, and nitrilotrimethylphosphonic acid. It is suitable to add the phosphoric acid compound to the cooling-water system such that the concentration of the phosphoric acid compound in the cooling-water system is 0 to 1.5 mg/L as $PO_4$.

In the present invention, in order to limit the phosphorus concentration in the RO membrane concentrate, it is preferable to prevent corrosion by using the carboxyl group-containing polymer, which serves as a dispersant, without adding the phosphoric acid compound to the cooling-water system.

Zinc chloride is suitably used as the zinc compound. It is suitable to add the zinc compound to the cooling water such that the concentration of zinc in the cooling water is 0 to 5 mg/L.

In the case where portions of the open-circulatory cooling-water system which come into contact with the cooling water are made of copper or a copper alloy, an aromatic azole is preferably added to the cooling water in order to prevent corrosion of copper or the copper alloy. Examples of the aromatic azole include tolyltriazole, benzotriazole, halo-substituted benzotriazole, halo-substituted tolyltriazole, and mercaptobenzothiazole.

Clarification Facility

The clarification facility in which the cooling water effluent is treated prior to the RO membrane treatment of the cooling water effluent is not limited and may be any clarification facility capable of removing foreign matter, a SS component, solid particles, a colloidal component, and the like contained in the cooling water effluent which may foul the membrane included in the RO membrane device. Examples of the clarification facility include a filter, a strainer, a bag filter, a string-wound filter, a disc filter, a microfiltration (MF) membrane, and an ultrafiltration (UF) membrane. The above clarification facilities may be used in combination of two or more. In the case where a MF membrane or an UF membrane is used, it is preferable to install a strainer or the like at a position upstream of the membrane and thereby remove coarse particles in order to protect the membrane.

As a strainer, in particular, a self-cleaning, automatic strainer may be suitably used.

The shape of the strainer is not limited; various shapes of strainers, such as a Y-shaped strainer and a bucket-shaped strainer, may be used.

The diameter of openings formed in the strainer varies depending on whether a MF or UF membrane is disposed downstream of the strainer. In the case where a MF or UF membrane is used in combination with the strainer, the diameter of openings of the strainer is preferably 100 to 500 μm. If the diameter of the openings of the strainer is smaller than 100 μm, clogging of the strainer may significantly occur. If the diameter of the openings of the strainer is larger than 500 μm, the solid particles and foreign matter may fail to be removed sufficiently.

In the case where a strainer or, in particular, an automatic strainer is used alone, the diameter of the openings of the strainer is preferably further small, that is, about 1 to 100 μm and is particularly preferably about 1 to 50 μm.

The form of the MF or UF membrane is not limited; a hollow-fiber-membrane filtering device, a spiral-membrane filtering device, and the like may be employed. The membrane filtering method is not limited; internal-pressure filtration, external-pressure filtration, cross-flow filtration, and dead-end filtration may be employed.

The cut-off molecular weight of the UF membrane is preferably 30,000 or more. An UF membrane having a cut-off molecular weight of less than 30,000 is impermeable to the dispersant contained in the cooling water effluent, which may result in the need to again add the dispersant to the cooling water effluent at a position upstream of the RO membrane device. The upper limit of the cut-off molecular weight of the UF membrane is not specified but preferably 1,000,000 or less in order to remove high-molecular polysaccharides and the like contained in the cooling water effluent, which may cause clogging of the RO membrane. The diameter of pores formed in the MF membrane is preferably about 0.01 to 0.1 μm for the same reasons as in the cut-off molecular weight of the UF membrane.

The rate at which the above-described dispersant passes through the clarification facility used in the present invention, which is calculated using the following formula, is preferably 80% or more and is particularly preferably 85% or more. If the pass rate of the dispersant is lower than the lower limit, the advantageous effects of the present invention may fail to be achieved with efficiency. The upper limit of the pass rate of the dispersant is normally 100%.

Pass rate=(Concentration of dispersant in water treated in clarification facility/Concentration of dispersant in water fed to clarification facility)×100

The pH of water fed to the clarification facility (i.e., water to be treated in the clarification facility) is not limited but is preferably 5 or more and is particularly preferably 7 or more. If the pH of water fed to the clarification facility is lower than 5, the degree of dissociation of carboxyl groups may be changed and, consequently, the dispersant polymer may become insoluble. The upper limit of the pH of water fed to the clarification facility is not specified. Since the cooling water effluent, such as blowdown water from a cooling tower, has a pH of 8 to 10 and commonly has a pH of about 8 to 9, it is preferable to treat such cooling water effluent directly in the clarification facility.

RO Membrane Device

Treated water produced by treating the cooling water effluent in the above-described clarification facility (i.e., clarified water) is subsequently desalinated in an RO membrane device.

The type of an RO membrane included in the RO membrane device is not limited and selected appropriately in accordance with the qualities of the cooling water effluent that is to be treated (i.e., qualities of raw water fed to the circulating cooling-water system and the cycles of concentration of the circulating cooling-water system). The salt rejection rate of the RO membrane is preferably 80% or more and is particularly preferably 85% or more. An RO membrane having a salt rejection rate lower than the above limit reduces desalination efficiency and prevents production of treated water (i.e., permeate) having good qualities. The material for the RO membrane is not limited, and RO membranes made of various materials, such as a polyamide composite membrane and a cellulose acetate membrane, may be used. The shape of the RO membrane is not limited; various shapes of RO membranes, such as a hollow-fiber RO membrane and a spiral RO membrane, may be used.

There is the preferable range of the pH of the RO membrane feed (i.e., water passed into the RO membrane device as water that is to be treated) as described below. It is preferable to interpose a pH-control unit that controls the pH of the RO membrane feed by adding an acid to the feed between the clarification facility and the RO membrane device in order to control the pH of the RO membrane feed. An example of the pH-control unit is a unit capable of adding an acid directly to a line through which the RO membrane feed is introduced or an inline mixer disposed on the line or to an optional pH-control tank by using a chemical feed pump or the like. The acid is not limited; inorganic acids, such as hydrochloric acid, sulfuric acid, and nitric acid, may be suitably used.

In the circulating cooling-water system operated at high cycles of concentration, commonly, the pH of the circulating cooling water is increased to about 8 to 9. While cooling water effluent having such a high pH is suitable for allowing the dispersant to pass through the clarification facility, scaling may occur in the RO membrane device when the cooling water effluent is further condensed. Thus, it is suitable to operate the RO membrane device at a reduced pH in order to reduce the occurrence of scaling. The pH of the RO membrane feed is preferably 4.0 to 7.5. If the pH of the RO membrane feed exceeds 7.5, calcium carbonate, calcium phosphate, calcium sulfate, and barium sulfate may precipitate as scale depending on the qualities of the RO membrane feed.

When the concentration of silica in the cooling water effluent exceeds 30 mg/L, it is preferable to reduce the pH of the RO membrane feed to 4.0 to 5.5 in order to reduce the precipitation of silica. The lower the pH of the RO membrane feed, the better the reduction in the precipitation of scale. However, reducing the pH of the feed to be less than 4.0 requires large amount of acid, which is not advantageous from an economic viewpoint.

A large content of humic acid or fulvic acid in the cooling water effluent may cause clogging of the RO membrane. In such a case, the pH of the cooling water effluent is preferably set to 5.5 to 7.0 and is particularly preferably set to 5.5 to 6.5. When the pH of the cooling water effluent falls within the above range, humic acid or fulvic acid undergoes acid dissociation and the occurrence of clogging of the RO membrane may be reduced. In addition, Ca contained in the cooling water can be effectively dispersed with a dispersant. This reduces the likelihood of Ca forming a complex with fulvic acid.

In the present invention, a dispersant capable of passing through the clarification facility is added to the circulating cooling-water system. This allows the dispersant contained in the cooling water effluent and brought into the water recovery system to enter the water treated in the clarification facility and enables a scale dispersion treatment to be performed in the RO membrane device with the dispersant passed through the clarification facility. Thus, the RO membrane feed needs to contain the dispersant at a certain concentration effective for the scale dispersion treatment.

The concentration of the dispersant in the RO membrane feed which is required for performing the scale dispersion treatment in the RO membrane device varies with the qualities of the cooling water effluent, the conditions under which the RO membrane treatment is performed (e.g., water recovery rate), and the like and cannot be determined unconditionally. Commonly, the concentration of the dispersant in the RO membrane feed is determined as follows.

The concentration of the dispersant in the RO membrane feed (in the case where the first and second dispersants are used in combination, the total concentration of the first and second dispersants) is preferably 3 mg/L or more as solid, is further preferably about 5 to 50 mg/L as solid, and is particularly preferably about 8 to 30 mg/L as solid.

In the case where the concentration of the dispersant in the RO membrane feed is not high enough to achieve a sufficient scale-dispersion effect in the RO membrane device, an additional dispersant is preferably added to the RO membrane feed on the entry side of the RO membrane device (i.e., a position between the clarification facility and the RO membrane device). The additional dispersant is the same as the above-described dispersant suitably used in the circulating cooling-water system. The dispersant added on the entry side of the RO membrane device is not necessarily the same as the dispersant added in the circulating cooling-water system and may be different from the dispersant added in the circulating cooling-water system.

In such a case, the amount of dispersant added to the RO membrane feed may be controlled such that the concentration of the dispersant in the RO membrane feed is equal to a predetermined concentration while monitoring the concentration of the dispersant in the RO membrane feed. The dispersant concentration may be measured by turbidimetry (e.g., the method described in JP 2006-64498 A). The additional dispersant may be added to the RO membrane feed by, for example, a dispersant addition unit driven in conjunction with a unit that measures the concentration of the dispersant in the RO membrane feed.

In order to use the dispersant added to the circulating cooling-water system as a dispersant for the RO membrane device in accordance with the present invention, the dispersant added to the circulating cooling-water system and contained in the cooling water effluent needs to maintain a certain activity required for the dispersant to serve as a dispersant even after the dispersant has reached the RO membrane device. Since the activity of the dispersant is affected by the length of residence time during which cooling water is retained in a cooling tower included in the circulating cooling-water system, in some cases, it is preferable to adjust the length of residence time during which cooling water is retained in a cooling tower of the circulating cooling-water system such that the dispersant exhibits a sufficient activity in the RO membrane device.

The water recovery rate of the RO membrane device is preferably determined in consideration of the likelihood of precipitation of scale in the RO membrane device. Since the electric conductivity of the cooling water effluent that is to be treated in the present invention and the concentrations of Ca, Mg, and the like in the cooling water effluent, which may cause scaling, may fluctuate, the water recovery rate of the RO membrane may be adjusted in accordance with the electric conductivity of the RO condensate, the concentrations of Ca and Mg in the RO concentrate, and the like. The water recovery rate may also be set by determining the occurrence of scaling in accordance with pH, dispersant concentration, water quality, and the like.

Specifically, the following control may be made.

An electric conductivity meter is used for measuring the electric conductivities of the cooling water effluent, the RO membrane feed, and/or the RO membrane concentrate. The likelihood of precipitation of scale in the RO membrane device is determined on the basis of the electric conductivities measured, and the water recovery rate of the RO membrane device is controlled accordingly. In the case where the electric conductivities measured with the electric conductivity meter are high, the likelihood of precipitation of scale is determined to be high and the degree of opening of a valve through which the RO membrane permeate is drawn is reduced in order to reduce water recovery rate. Conversely, in the case where the electric conductivities measured with the electric conductivity meter are low, the likelihood of precipitation of scale is determined to be low and the degree of opening of a valve through which the RO membrane permeate is drawn is increased in order to increase water recovery rate.

The concentrations of the dispersant in the cooling water effluent and/or the RO membrane feed are measured. In the case where the measured dispersant concentrations are high, the likelihood of precipitation of scale is determined to be low and the degree of opening of a valve through which the RO membrane permeate is drawn is increased in order to increase water recovery rate. Conversely, in the case where the measured dispersant concentrations are low, the likelihood of precipitation of scale is determined to be high and the degree of opening of a valve through which the RO membrane permeate is drawn is reduced in order to reduce water recovery rate.

In the case where the risk of formation of silica scale in the RO membrane device is particularly high, the inside of the device is preferably flushed with the unconcentrated cooling water effluent, the RO membrane permeate, pure water, or deionized water when the operation of the RO membrane device is stopped. This is because, if the operation of the RO membrane device is stopped with the concentrate remaining inside the RO membrane device, silica and the like may precipitate as scale depending on the length of the time during which the operation of the RO membrane device is stopped, which makes it impossible to consistently operate the RO membrane device after the operation of the device has been restarted. In such a case, for example, when the operation of the RO membrane device is stopped, the portions of the RO membrane device which are located on the primary side (i.e., feed side) and the secondary side (i.e., concentrate side) of the RO membrane may be replaced with the RO membrane permeate by feeding the RO membrane permeate to the entry side of the RO membrane device in a circulatory manner and discharging the RO membrane concentrate to the outside of the system.

Other Treatments

A slime control agent may be added to the circulating cooling-water system according to the present invention. Examples of the slime control agent include hypochlorites, such as sodium hypochlorite (NaClO); chlorine gas; chlorine agents, such as chlorine gas, chloramine, and chlorinated isocyanurate; combined-chlorine agents produced by the reaction of chlorine with amidosulfuric acid or a compound including an amidosulfuric acid group, such as monochlorosulfamic acid; bromine agents, such as dibromohydantoin; organic agents such as DBNPA (dibromonitrilopropionamide) and MIT (methylisothiazolone); hydrazine; and hydantoin (e.g., 5,5-dimethylhydantoin).

In the RO membrane device, a slime control treatment may be performed with the slime control agent added to the circulating cooling-water system. An additional slime control agent may be further added to the water at a position upstream of the RO membrane device for performing the slime control treatment. In the case where there is a risk of the chlorine agent or the like degrading the RO membrane by oxidation, the chlorine agent contained in the cooling water effluent may be removed by reduction before the additional slime control agent is added to the cooling water effluent.

The number of the slime control agents used may be only one. Alternatively, two or more slime control agents may be used simultaneously or alternately. The slime control agent may be used on a continuous or intermittent basis.

In the case where the cooling water effluent contains heavy-metal ions, such as copper ions and iron ions originating from a heat exchanger, accelerated degradation of the RO membrane may occur in the presence of a chemical having an oxidization-reduction effect, such as sodium hypochlorite or hydrazine, and the heavy-metal ions. In such a case, adding a substance (e.g., EDTA) capable of chelating heavy-metal ions to the cooling effluent prevents the contact of the heavy-metal ions with the membrane and the occurrence of the accelerated degradation.

Polyamide RO membranes become degraded when brought into contact with a hypochlorite regardless of whether or not heavy-metal ions are present in the cooling water effluent. It is preferable to avoid the use of hypochlorites, which are highly likely to degrade the membrane. In the case where a hypochlorite is used, it is preferable to remove residual chlorine from the cooling water effluent before the cooling water effluent is passed into the RO membrane device.

In the present invention, a high-molecular compound including a phenolic hydroxyl group (hereinafter, may be referred to as "phenolic high-molecular compound") which serves as a coagulant aid may be added to the cooling water effluent that is to be treated in order to enhance the consistency of the operation of the clarification facility and the RO membrane device.

Examples of the phenolic high-molecular compound include polyvinylphenol polymers, such as a homopolymer of vinylphenol, a homopolymer of a modified vinylphenol, a copolymer of vinylphenol with a modified vinylphenol, and a copolymer of vinylphenol and/or a modified vinylphenol with a hydrophobic vinyl monomer; and phenolic resins, such as a polycondensate of phenol with formaldehyde, a polycondensate of cresol with formaldehyde, and a polycondensate of xylenol with formaldehyde. The phenolic high-molecular compound is particularly preferably a compound produced by the resole-type second reaction of the novolac-type phenolic resin described in JP 2010-131469 A, JP 2013-255922 A, JP 2013-255923 A, or the like.

The melting point of the phenolic high-molecular compound produced by the resole-type second reaction of the novolac-type phenolic resin is preferably 130° C. to 220° C. and is particularly preferably 150° C. to 200° C. The weight-average molecular weight of the phenolic high-molecular compound is preferably 5,000 to 50,000 and is more preferably 10,000 to 30,000.

The amount of phenolic high-molecular compound used varies with the qualities of the cooling water effluent and is not limited. The amount of phenolic high-molecular compound used is preferably set such that the concentration of the active component is about 0.01 to 10 mg/L.

In the present invention, treating the cooling water effluent for a long period of time may cause clogging of the clarification facility, such as a MF membrane device, and the RO membrane device and reduce the amount of water (permeate) treated. In such a case (i.e., in the case where water recovery rate is reduced), cleaning the above devices removes the clogging substances and restores the amount of treated water. The chemical used for cleaning the above devices may be selected appropriately from hydrochloric acid, sulfuric acid, nitric acid, sodium hypochlorite, sodium hydroxide, citric acid, oxalic acid, and the like depending on the clogging substances and the materials of the membranes.

EXAMPLES

The present invention is described more specifically with reference to Examples below. However, the present invention is not limited by Examples below within the scope of the present invention.

[Dispersant]

The properties of the dispersants used in Examples and Comparative examples below are as follows.

AA/AMPS: Copolymer of acrylic acid with AMPS, acrylic acid:AMPS (molar ratio)=70:30, weight-average molecular weight=10,000

AA/HAPS: Copolymer of acrylic acid with HAPS, acrylic acid:HAPS (molar ratio)=70:30, weight-average molecular weight=8,000

MA/IB: Copolymer of maleic acid with isobutylene, maleic acid:isobutylene (molar ratio)=50:50, weight-average molecular weight=15,000

PMA: Polymaleic acid, weight-average molecular weight=2,000

PAA-1: Polyacrylic acid, weight-average molecular weight=4,500

PAA-2: Polyacrylic acid, weight-average molecular weight=15,000

[Cooling Water Effluent]

The cooling water effluent subjected to a water recovery treatment in Examples and Comparative examples below was blowdown water from a cooling tower included in a circulating cooling-water system operated using industrial water of Chiba as raw water at cycles of concentration of 3.5 times (hereinafter, this blowdown water is referred to simply as "blowdown water").

A specific one of the dispersants described in Examples and Comparative examples was added to the circulating cooling-water system such that the concentration of the dispersant in the system was maintained to be a predetermined concentration. In addition, sodium hypochlorite (NaClO) was added to the circulating cooling-water system such that the concentration of residual chlorine in the system was 0.5 mg/L as $Cl_2$ in order to perform a slime control treatment.

The circulating cooling-water system used in Examples 1 to 5 and Comparative examples 1 to 4 included copper pipes. The circulating cooling-water system used in Example 6 included iron pipes.

The pH of the blowdown water was 8.5 to 8.9 (about 8.8).

Example 1

Cooling water including PMA having a weight-average molecular weight of 2,000 which served as a dispersant was subjected to a water recovery treatment in which a strainer and a MF membrane device were used as clarification facilities and the blowdown water was treated with the strainer, the MF membrane device, and an RO membrane device sequentially in this order.

The diameter of mesh openings formed in the strainer was 400 μm. The MF membrane used was "Purear GS (hydrophilic PVDF; pore diameter: 0.02 μm, external pressure type)" produced by Kuraray Co., Ltd. The RO membrane used was "KROA-2032-SN (polyamide ultralow-pressure RO membrane)" produced by Kurita Water Industries Ltd. The MF membrane device was cleaned once every 30 minutes.

The blowdown water was directly passed through the strainer and the MF membrane device sequentially without the pH of the blowdown water being controlled in advance. Sulfuric acid was subsequently added to the blowdown water on the entry side of the RO membrane device in order to control the pH of the water to be 5.0. Sodium bisulfite was added also to the blowdown water on the entry side of the RO membrane device in order to reduce the concentration of residual chlorine in the water to 0.05 mg/L or less. Furthermore, 10 mg/L of "KURIVERTER (registered trademark) IK-110" (combined chlorine slime control agent) produced by Kurita Water Industries Ltd. was added to the blowdown water in order to perform a slime control treatment of the RO membrane device.

The initial water recovery rates of the MF membrane device and the RO membrane device were set to 90% and 80%, respectively. The total water recovery rate was set to 72%. Since the blowdown water contained a high concentration of organic substances, the water recovery rates of the MF membrane device and the RO membrane device gradually decreased with time. Thus, when the water recovery rate of a device decreased to be less than 50%, the operation of the device was stopped in order to clean the device and restarted under conditions such that the total water recovery rate was 72%. The blowdown water was continuously passed through the devices and recovered for one month in the above manner.

In the above water recovery treatment, the concentration of the dispersant in the blowdown water fed to the MF membrane was 10 mg/L as solid. The average water recovery rate over the one-month period was 70%.

Since a phosphoric acid compound was not added to the cooling water, the concentration of phosphate ions in the RO membrane concentrate was less than 0.5 mg/L.

Example 2

The blowdown water was recovered as in Example 1, except that, instead of PMA having a weight-average molecular weight of 2,000, PAA-1 having weight-average molecular weight of 4,500 was used as a dispersant at a concentration of 10 mg/L as solid. Table 1 shows the average water recovery rate and the concentration of phosphate ions in the RO membrane concentrate.

Example 3

The blowdown water was recovered as in Example 1, except that, instead of PMA having a weight-average molecular weight of 2,000, PMA having a molecular weight of 2,000 was used as a first dispersant at a concentration of 5 mg/L as solid and AA/AMPS having a molecular weight of 10,000 was used as a second dispersant at a concentration of 5 mg/L as solid. Table 1 shows the average water recovery rate and the concentration of phosphate ions in the RO membrane concentrate.

Example 4

The blowdown water was recovered as in Example 1, except that, instead of PMA having a weight-average molecular weight of 2,000, PMA having a molecular weight of 2,000 was used as a first dispersant at a concentration of 5 mg/L as solid and AA/HAPS having a molecular weight of 8,000 was used as a second dispersant at a concentration of 5 mg/L as solid. Table 1 shows the average water recovery rate and the concentration of phosphate ions in the RO membrane concentrate.

Example 5

The blowdown water was recovered as in Example 1, except that an automatic strainer having an opening size of 5 μm was used as a clarification facility. Table 1 shows the average water recovery rate and the concentration of phosphate ions in the RO membrane concentrate.

Example 6

The blowdown water was recovered as in Example 1, except that zinc chloride that served as an anticorrosive for the iron pipes was added to the circulating cooling-water system at a concentration of 2.5 mg/L as Zn. Table 1 shows the average water recovery rate and the concentration of phosphate ions in the RO membrane concentrate.

Comparative Example 1

The blowdown water was recovered as in Example 1, except that, instead of PMA having a weight-average molecular weight of 2,000, MA/IB having a molecular weight of 15,000 was used as a dispersant at a concentration of 10 mg/L as solid. Table 1 shows the average water recovery rate and the concentration of phosphate ions in the RO membrane concentrate.

The average water recovery rate in Comparative example 1 was 52%, because MA/IB caused clogging of the MF membrane and the RO membrane.

Comparative Example 2

The blowdown water was recovered as in Example 1, except that, instead of PMA having a weight-average molecular weight of 2,000, AA/AMPS having a molecular weight of 10,000 was used as a dispersant at a concentration of 10 mg/L as solid. Furthermore, orthophosphoric acid that served as an anticorrosive was added to the cooling water at a concentration of 6 mg/L as $PO_4$. Table 1 shows the average water recovery rate and the concentration of phosphate ions in the RO membrane concentrate.

In Comparative example 2, since orthophosphoric acid was added to the cooling water, the concentration of phosphate ions in the RO membrane concentrate was 30 mg/L. Therefore, there was a need for additional wastewater treatment of the RO membrane concentrate.

Comparative Example 3

The blowdown water was recovered as in Comparative example 2, except that the pH of water fed to the clarification facility was set to 5.0. Table 1 shows the average water recovery rate and the concentration of phosphate ions in the RO membrane concentrate.

In Comparative example 3, the dispersant caused clogging of the MF membrane, which reduced the average water recovery rate to 56%. In addition, the concentration of phosphate ions in the RO membrane concentrate was 30 mg/L. Therefore, there was a need for additional wastewater treatment of the RO membrane concentrate.

Comparative Example 4

The blowdown water was recovered as in Example 1, except that, instead of PMA having a weight-average molecular weight of 2,000, PPA-2 having a molecular weight of 15,000 was used as a dispersant at a concentration of 10 mg/L as solid. Table 1 shows the average water recovery rate and the concentration of phosphate ions in the RO membrane concentrate.

In Comparative example 4, polyacrylic acid having a high molecular weight caused clogging of the MF membrane and the RO membrane, which reduced the average water recovery rate to 54%.

TABLE 1

| | First dispersant | | Second dispersant | | | | | | $PO_4$ concentration of concentrated |
| --- | --- | --- | --- | --- | --- | --- | --- | --- | --- |
| | Kind ※1 | Concentration maintained (mg/L) | Kind ※1 | Concentration maintained (mg/L) | Clarification facility | pH of feed water of clarification facility | pH of feed water of RO membrane | Average water recovery rate (%) | water of RO membrane (mg/L) |
| Example 1 | PMA (2,000) | 10 | — | — | strainer + MF membrane | 8.8 | 5.0 | 70 | <0.5 |
| Example 2 | PAA-1 (4,500) | 10 | — | — | strainer + MF membrane | 8.8 | 5.0 | 70 | <0.5 |
| Example 3 | PMA (2,000) | 5 | AA/AMPS (10,000) | 5 | strainer + MF membrane | 8.8 | 5.0 | 71 | <0.5 |
| Example 4 | PMA (2,000) | 5 | AA/HAPS (8,000) | 5 | strainer + MF membrane | 8.8 | 5.0 | 70 | <0.5 |
| Example 5 | PMA (2,000) | 10 | — | — | autostrainer | 8.8 | 5.0 | 67 | <0.5 |
| Example 6 ※3 | PMA (2,000) | 10 | — | — | strainer + MF membrane | 8.8 | 5.0 | 70 | <0.5 |
| Comparative Example 1 | MA/IB (15,000) | 10 | — | — | strainer + MF membrane | 8.8 | 5.0 | 52 | <0.5 |
| Comparative Example 2 | AA/AMPS (10,000) | 10 | — | — | strainer + MF membrane | 8.8 | 5.0 | 70 | 30 ※2 |
| Comparative Example 3 | AA/AMPS (10,000) | 10 | — | — | strainer + MF membrane | 5.0 | 5.0 | 56 | 30 ※2 |
| Comparative Example 4 | PAA-2 (15,000) | 10 | — | — | strainer + MF membrane | 8.8 | 5.0 | 54 | <0.5 |

※1 Parenthesized is a weight average molecular weight.
※2 Orthophosphoric acid was added to cooling water.
※3 Iron piping in Example 6, copper piping in the other Examples and Comparative Examples.

The above results confirm that the method according to the present invention enables consistent treatment with a high water recovery rate by using the dispersant added to the cooling-water system.

In Examples 1 to 6, a high anticorrosive effect was achieved even without adding a phosphoric acid compound that serves as an anticorrosive to the cooling-water system and the adverse effects of discharging phosphorus contained in the RO membrane concentrate were reduced.

Although the present invention has been described in detail with reference to a particular embodiment, it is apparent to a person skilled in the art that various modifications can be made therein without departing from the spirit and scope of the present invention.

The present application is based on Japanese Patent Application No. 2015-137916 filed on Jul. 9, 2015, which is incorporated herein by reference in its entirety.

The invention claimed is:

1. A method for recovering water discharged from a circulating cooling water system in which cooling water containing a first dispersant and a second dispersant is circulating, the method comprising:
   treating the discharged water containing the first dispersant and the second dispersant with a microfiltration membrane as a water recovery system, the first dispersant and the second dispersant being configured to pass through the microfiltration membrane;
   treating the water containing the first dispersant and the second dispersant with a reverse-osmosis membrane while treating the reverse-osmosis membrane with the first dispersant and the second dispersant for scale dispersion treatment; and
   returning the treated water to the circulating cooling water system,
   wherein the first dispersant includes a carboxyl group-containing polymer having a weight-average molecular weight of 5,000 or less, and the second dispersant includes a sulfonic group-containing polymer,
   wherein the carboxyl group-containing polymer comprises a polymer of acrylic acid, methacrylic acid, maleic acid, or epoxysuccinic acid, a copolymer of two or more of the above acids, a salt of the polymer, or a salt of the copolymer,
   wherein the dispersant is absent from phosphoric acid compound, and
   wherein the sulfonic group-containing polymer is a copolymer produced by copolymerization of methacrylic acid and/or acrylic acid with 3-allyloxy-2-hydroxy-1-propanesulfonic acid and/or 2-acrylamido-2-methyl-propanesulfonic acid.

2. The method for recovering water according to claim 1, wherein the pH of water fed to the microfiltration membrane is 7 or more.

3. The method for recovering water according to claim 1, wherein the pH of water fed to the reverse-osmosis membrane is adjusted to be 4.0 to 7.5.

4. The method for recovering water according to claim 1, wherein a zinc compound is added to the circulating cooling water system, the zinc compound serving as an anticorrosive.

5. The method for recovering water according to claim 4, wherein the sulfonic group-containing polymer is added to prevent the zinc compound from precipitating as scale thereby enhancing a corrosion resistance of the circulating cooling water system.

6. The method for recovering water according to claim 1, wherein the first dispersant does not include a sulfonic group-containing polymer.

7. The method for recovering water according to claim 1, wherein the carboxyl group-containing polymer is added to prevent corrosion of the circulating cooling water system.

8. The method for recovering water according to claim 1, wherein a weight-average molecular weight of the sulfonic group-containing polymer is 1,000 to 30,000.

9. The method for recovering water according to claim 1, wherein a ratio between amounts of the first dispersant and the second dispersant is 1:1 to 1:9.

10. The method for recovering water according to claim 1, wherein the pH of water fed to the microfiltration membrane is 7 or more, and the pH of water fed to the reverse-osmosis membrane is adjusted to 4.0-5.5 when concentration of silica in a cooling water effluent exceeds 30 mg/L.

\* \* \* \* \*